INVENTOR.
IRVING ITZKAN
BY
John H. Gallagher
ATTORNEY

INVENTOR.
IRVING ITZKAN
BY
John H. Gallagher
ATTORNEY

United States Patent Office 3,217,248
Patented Nov. 9, 1965

3,217,248
AUTOMATIC PLOTTING OF PERTURBATION MEASUREMENTS IN ELECTROMAGNETIC WAVE STRUCTURES
Irving Itzkan, New York, N.Y., assignor to Sperry Rand Corporation, Great Neck, N.Y., a corporation of Delaware
Filed May 31, 1962, Ser. No. 199,132
5 Claims. (Cl. 324—58)

This invention relates to a method and apparatus for automatically performing perturbation measurements on electromagnetic wave structures and for automatically recording the relevant information obtained from such measurements.

The type of measurement made and recorded in accordance with this invention is particularly useful in evaluating the characteristics of slow wave interaction structures employed in electron discharge devices of the traveling wave tube variety, as well as other devices such as klystron cavities, crossed field circuits, cyclotron resonance device circuits, etc.

Figure 1:
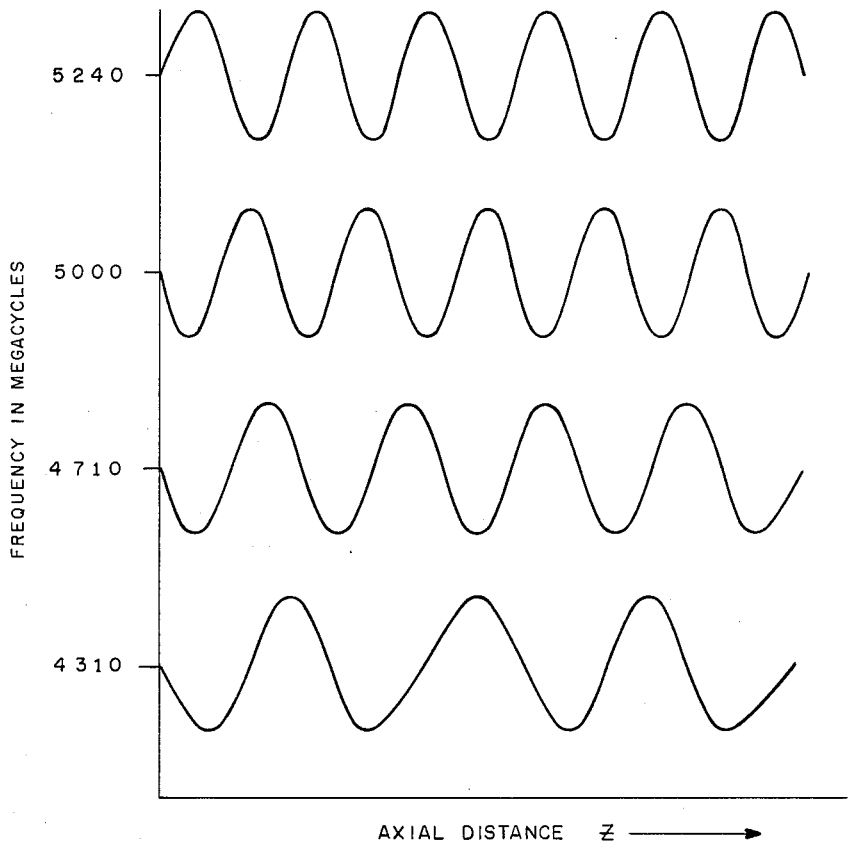

In studying these slow wave structures, some of the electrical characteristics that are helpful in evaluating the usefulness of a structure are the group and phase velocities of waves at different regions along the structure, the interaction impedance of the structure, the amplitudes and configurations of the electric and magnetic fields supported by the structure, and the bandwidth. These characteristics may be determined either directly or indirectly from data obtained by the well-known technique of bead perturbation measurements, this data representing the change in resonant frequency ($\Delta f$) of a resonant structure that results from the change in the position of a field perturbing object as the object is passed through the structure, and from the well-known Brillouin diagram dispersion curve, a plot of frequency ($\omega$) versus phase shift ($\beta$) through the structure, this $\omega$-$\beta$ diagram in turn being constructed from data obtained from a number of perturbation measurements conducted for a number of different resonant frequencies of the structure. FIG. 1 illustrates the curves of frequency versus axial distance Z obtained by the perturbation measurement technique for a number of different resonant frequencies. The information for plotting the $\omega$-$\beta$ diagrams may be obtained by short-circuiting the two ends of the slow wave structure so as to form a resonant cavity, and performing perturbation measurements to determine the change in resonant frequency ($\Delta f$) as a function of the position of a field-perturbing object, such as a small dielectric bead, as the object is drawn through the structure. The theory and procedure for conducting perturbation measurements and for constructing $\omega$-$\beta$ diagrams therefrom is set forth in sections 10.3–10.7 of Microwave Measurements, by Ginzton, published by McGraw-Hill Book Company, Inc., 1957. As explained in the Ginzton reference, the change in resonant frequency, as obtained from the perturbation measurements, is proportional to $|E|^2$, the magnitude of the total electric field at the position of the object in the structure, so that the total electromagnetic wave field distribution through an interaction structure may be obtained from these perturbation measurements. The Fourier analysis of this field distribution will give the space harmonic components of the total field.

Figure 2:
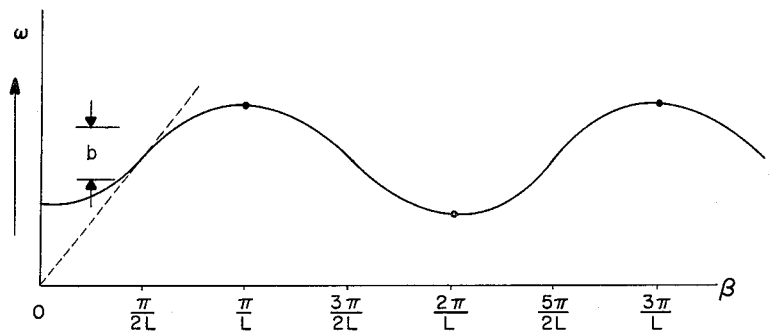

A typical $\omega$-$\beta$ diagram, which is plotted from curves of the type illustrated in FIG. 1, is illustrated in FIG. 2 for a fundamental forward-wave slow wave structure. From this diagram a considerable amount of information may be gained about the properties of the circuit. The slope of a straight line drawn tangent to a point on the curve gives the group velocity, $$V_g = \frac{d\omega}{d\beta}$$

at the corresponding point in the structure, and the slope of a line drawn from the origin to a point on the curve gives the phase velocity, $$v_p = \frac{\omega}{\beta}$$

at the point in question. It may be seen that the curve is increasing in the region $$0 < \beta < \frac{\pi}{2}$$

indicating that the group velocity $d\omega/d\beta$ of the circuit is positive, as is the slope of a line from the origin to that point, indicating that the phase velocity $\omega/\beta$ of the fundamental space harmonic component is positive. This establishes the characteristic that the structure is a fundamental forward-wave circuit. For forward-wave amplification, the electron beam velocity, which is given by the slope of the dashed line in FIG. 2, is made to equal the phase velocity of the fundamental space harmonic near mid-band. Amplification occurs only at those frequencies where the circuit phase velocity does not depart by an appreciable amount from the electron beam velocity. Thus, the approximate bandwidth is immediately obtainable from the $\omega$-$\beta$ curve, and is illustrated by the frequency range "b" on FIG. 2.

The degree of interaction of the electron beam with a particular space harmonic field with which the beam is synchronized is given by the interaction impedance for the space harmonic. The interaction impedance is defined as $$Z_n = \frac{E^2_{zn}}{2\beta_n^2 P}$$

where $E_{zn}$ is the peak amplitude of the axial electric field component for the space harmonic in question, $\beta_n$ is the phase shift constant of the space harmonic, and P is the total power flow in the circuit, which is equal to the product of the group velocity and the total average stored electromagnetic energy per unit length, $P = v_g W_1$. Since the frequency shift of the circuit as obtained from the perturbation method is proportional to $E^2_{zn}$, the field configurations and patterns of the total fields and the space harmonic fields of the structure are readily obtained from the curves of the type illustrated in FIG. 1. By passing the perturbing object through different portions of the structure, and/or by using different types of perturbing objects, the electric and magnetic fields of the electromagnetic waves on the structure may be determined.

In accordance with the present invention, perturbation measurements are automatically recorded for the resonant structure by coupling recurring frequency modulated pulses into the structure. The frequency sweep of the pulses includes the resonant frequency of the structure with the perturbing object therein, so that the structure will be swept through its resonance frequency during each pulse period. The frequency response characteristic of the structure, which is the conventional bell shaped curve, is obtained and this curve is differentiated to produce a waveform having a zero cross-over point that corresponds to the maximum amplitude of the resonance curve, i.e., resonance point on the curve. A trigger circuit generates a gating pulse whose leading edge commences at the time the differentiated waveform passes through the zero cross-over point. Thus the time of occurrence of the gating pulse varies as the resonant frequency of the structure varies, the resonant frequency varying as the field-perturbing object is drawn through the structure. The gating pulses sample a recurring sawtooth waveform that is synchronized with the occurrence of the input frequency modulated pulses, so that different magnitudes of the sawtooth are sampled as the gating pulses vary in time of occurrence. The sampled portions of the sawtooth waveform are coupled to a box car detector and its output, a varying D.C. voltage, is coupled to the input terminal of the vertical deflection means of a rectangular coordinate recording plotter and the input to the horizontal deflection means of the plotter is a D.C. signal whose amplitude is proportional to the position of the field-perturbing object in the resonant structure. Thus the curve automatically recorded on the plotter represents the resonant frequency of the structure as a function of the position of the field-perturbing object. This automatic plotting means represents a considerable savings of time and effort over the prior art measurement technique where the field perturbing object was moved intermittently from point to point through the resonant structure and a separate frequency measurement made at each point and then the relevant data manually plotted.

It therefore is an object of this invention to provide means for automatically making and recording perturbation measurements on an electromagnetic wave structure.

It is another object of this invention to automatically plot a curve whose magnitude at any point is proportional to the square of the magnitude of the electromagnetic field at a corresponding point in an elecromagnetic wave structure.

A further object of the invention is to automatically plot a curve representing resonant frequency versus position in a resonant electromagnetic wave structure as a field perturbing object is passed through the structure.

Figure 3:
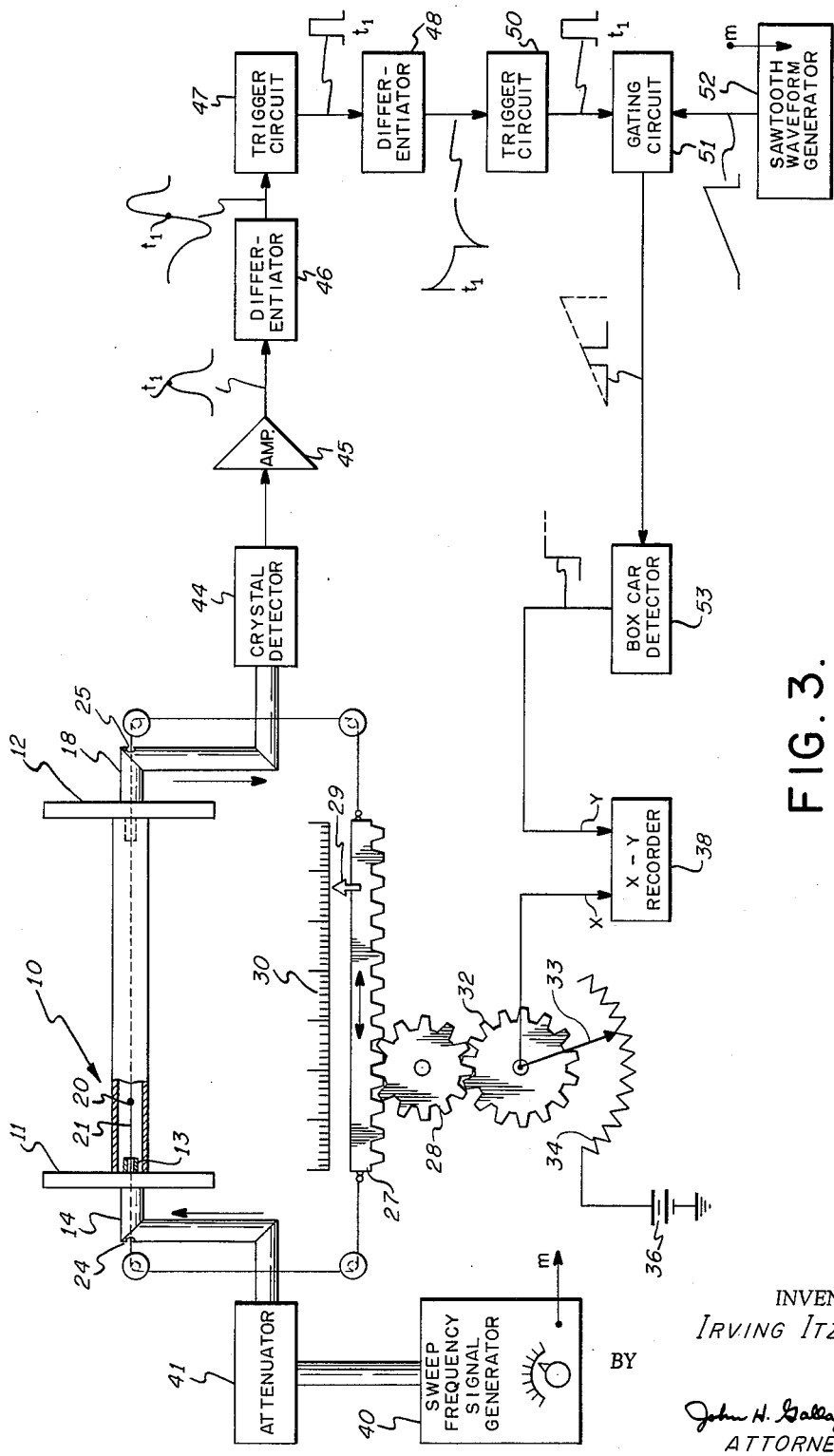

The present invention will be described by referring to the drawings wherein:

FIG. 1 is an illustration of the types of curves automatically plotted by the apparatus of the present invention, FIG. 2 is a conventional $\omega$-$\beta$ diagram previously referred to, and FIG. 3 is a simplified schematic diagram, partially in block form, illustrating the automatic plotting means of the present invention.

Referring in detail to FIG. 3, the slow wave structure under investigation is illustrated by the numeral 10 and may be of any type, the particular type is not of significance so far as the description of this invention is concerned, except that for the purpose of analyzing the automatically plotted curves, the curves of FIG. 1 for example, the structure will be considered to be a fundamental forward-wave circuit having a number of sections formed by loading structures. Slow wave structure 10 is short-circuited at each of its ends, preferably at mirror-image planes of the structure, by respective conductive plates 11 and 12. Waves are launched onto the structure by any suitable means such as a short probe 13 that extends through conductive plate 11 and may comprise a hollow inner conductor of a coaxial transmission line 14. A small perturbing object 20, which may be a small bead of dielectric material, is positioned within the structure 10 and is movably supported therein by a thin thread 21 of nonconductive material such as nylon. Thread 21 passes through the hollow center conductor that forms input probe 13, and through a similar hollow center conductor at the opposite end of the structure that serves as a pick-up probe, and passes axially through coaxial transmission lines 14 and 18, and to the outside of the lines through small holes 24 and 25, respectively, which are small enough to have negligible effect upon the waves propagating in the respective transmission lines. Nylon thread 21 then is coupled via a suitable pulley arrangement to a rack member 27 which is transversely movable by means of a driver pinion gear 28. An indexing pointer 29 is secured to rack member 27, and in conjunction with a fixed index 30, provides means for indicating the axial position of the bead 20 within the slow wave structure 10. Pinion gear 28 also drives a follower gear 32 to which is secured the wiper arm 33 of a potentiometer 34. A voltage source 36 is coupled through potentiometer 34 to the X input terminal of X-Y recorder 38 so as to provide to X-Y recorder 38 a variable potential whose amplitude is a function of the axial position of perturbing bead 20 along slow wave structure 10.

Sweep-frequency signal generator 40 provides pulses of frequency modulated electromagnetic waves that are coupled through attenuator 41 and coaxial transmission line 14 to slow wave structure 10. During each pulse interval, the output waves from sweep-frequency signal generator 40 sweep through a band of frequencies that includes the resonant frequency of the structure under investigation. As an example, sweep frequency signal generator 40 may have a center frequency of 4310 megacycles per second with a frequency sweep of 5.0 megacycles per second. Waves coupled from the short circuited interaction structure 10 will propagate through the coaxial transmission line 18 to crystal detector 44, and then will be amplified in amplifier 45. The signal at this point in the circuit is a conventional resonance curve, or Q-curve, of a resonant structure. This waveform is differentiated in differentiator 46 to produce the illustrated waveform having a zero cross-over point that corresponds to the maximum point $t_1$ of the resonance curve. Thus, the zero cross-over point occurs as the frequency modulated pulse sweeps through the resonant frequency of the slow wave structure 10. The output of differentiator 46 is coupled to a trigger circuit 47 which produces a rectangular-shaped pulse whose leading edge commences at the time $t_1$. This rectangular-shaped pulse then is differentiated in a second differentiator 48 to produce a sharp spike corresponding to the leading edge of the rectangular-shaped pulse. This sharp spike in turn is coupled to a trigger circuit 50 which produces a rectangular-shaped gating pulse whose leading edge commences at time $t_1$. Trigger circuit 50 produces output pulses of fixed duration regardless of the starting times of the pulses. Because of times of occurrence of the leading edges of the output pulses from trigger circuit 50 are determined by the times of occurrence of the cross-over points on the output signals from differentiator 46, and these cross-over points are in turn determined by the resonant frequency of interaction structure 10 with the perturbing object 20, therein, it may be seen that the gating pulses produced by trigger circuit 50 are time modulated in accordance with the change in resonant frequency of interaction structure 10 as perturbing object 20 is passed therethrough. The gating pulse from trigger circuit 50 is coupled to gating circuit 51 along with a sawtoothed waveform from sawtooth waveform generator 52. The timing of sawtooth waveform generator 52 is synchronized with sweep frequency signal generator 40 by means of a connecting lead designated "m" so that the frequency modulated pulses and sawtooth waveforms occur substantially simultaneously. Gating circuit 51 passes the value of the sawtooth waveform during the time of occurrence of the gating pulse from trigger circuit 50. The output of gating circuit 51 is coupled to a box car detector 53 which produces a D.C. voltage proportional to the peak value of its most recently received input pulse. Therefore, as the perturbing bead 20 is drawn through slow wave structure 10 to cause the resonant frequency thereof to shift, the resonance curve and the gating pulse from trigger circuit 50 shift left or right to gate out different portions of the sawtooth waveform so as to cause the D.C. level of the output of box car detector 55 to rise or fall in a corresponding manner. The output of box car detector 53 is coupled to the Y input of X–Y recorder 38. Recorder 38 therefore plots a curve which represents the resonant frequency of slow wave structure 10 as a function of the axial position of perturbing bead 20 as the bead is drawn through the structure. The curve plotted in the manner just described may, for example, be the bottom curve in FIG. 1. In order to obtain the information necessary to plot the desired $\omega$–$\beta$ curve, the center frequency of sweep frequency generator 20 will be changed to one of the other resonant frequencies of interaction structure 10, and then the above-described procedure will be repeated to obtain another one of the curves illustrated in FIG. 1. After a number of these curves have been obtained, the $\omega$–$\beta$ diagram may be constructed in the manner described in section 10.7 of the above-mentioned Ginzton reference. Briefly stated, at each resonant frequency the phase shift per section is determined by counting the number of voltage nodes contained in the total length of the curve. Inasmuch as the number of nodes identifies the number of half wavelengths in the structure, dividing the number of nodes by the number of sections will give the phase shift per section at that resonant frequency. This then is plotted on the diagram of the type illustrated in FIG. 2. Repeating this procedure for the other $\Delta f$–Z curves corresponding to the other resonant frequencies of the structure will provide the information necessary to produce the $\omega$–$\beta$ diagram for that particular interaction structure, and the information to compute the interaction empedance $Z_n$, as defined above.

It thus may be seen that the apparatus and method of this invention considerably shortens the required time to plot an $\omega$–$\beta$ diagram because the frequency versus axial position along the structure is automatically plotted, as compared to the point-by-point procedure previously used.

The apparatus of the present invention also is admirably suited for further automatic computation of the value E, the strength of the electric field at a point in question, by coupling the output of box car detector 53 to an analogue computer which extracts the square root of the output signal from box car detector 53. Similarly, the analoque computer may operate upon the output signal of box car detector 53 to provide signals proportional to the fundamental and to any desired space harmonic of the electromagnetic waves on the interaction structure under investigation. With the use of the automatic plotting equipment of this invention the rate at which interaction structures may be investigated is determined solely by the rate at which they can be designed and constructed, whereas in the past, the rate of investigation was determined by the time required to conduct the laborious point-by-point investigation of the frequency shift with axial position of the perturbing object.

In the above description it was assumed that the perturbing object 20 was a small bead of dielectric material. This is but one type of perturbing object that may be used to advantage in investigating interaction structure. For example, needles of conductive material, or thin discs of conductive material also may be used in a similar manner so long as it is kept in mind the type of effect that the perturbing object has on both the electric and magnetic fields of the structure.

As indicated earlier, the perturbing object may be passed through various portions of the structure under investigation in order to more fully map the fields of the structure. Suitable mechanical arrangements may readily be made in most instances in order to provide different axial or transverse paths for the perturbing object.

While the invention has been described in its preferred embodiments it is to be understood that the words which have been used are words of description rather than of limitation and that changes within the purview of the appended claims may be made without departing from the true scope and spirit of the invention in its broader aspects.

What is claimed is:

1. Apparatus for automatically recording the resonant frequencies of a resonant electromagnetic wave structure as a function of the positions of a field-perturbing object that is passed through the electromagnetic field of waves supported by such structure, said apparatus comprising means for coupling recurrent pulses of frequency modulated electromagnetic waves to said structure,
the frequency of said pulses being swept through the resonant frequency of said structure during each pulse period,
means for passing a field-perturbing object through the electromagnetic field of waves on said structure and for providing a displacement signal that varies in amplitude as a function of the displacement of said object through said structure,
means coupled to said structure for producing a series of time-modulated pulses whose times of occurrence are a function of the resonant frequency of said structure with said perturbing object in the field of the waves supported by said structure,
means for generating recurring waveforms of uniformly-varying amplitudes in synchronism with occurrences of said frequency modulated pulses,
means coupled to receive said time-modulated pulses and said varying-amplitude waveforms and operating to produce output signals whose amplitudes are a function of the times of occurrence of the time-modulated pulses,
means coupled to receive said displacement signal and the output signal of said last-named means to provide an indication of the resonant frequency of said structure as a function of the position of the perturbing object as said object is passed through the field of the waves supported by said structure.

2. Apparatus for automatically making and recording perturbation measurements on a resonant electromagnetic wave structure comprising means for coupling recurrent pulses of frequency modulated electromagnetic waves to said structure,
the frequencies of said pulses being swept through a resonant frequency of said structure during each pulse period,
means for passing a field-perturbing object through the electromagnetic field of waves on said structure and for providing a first signal that varies in amplitude as a function of the position of said object relative to said structure,
means coupled to said structure for providing gating pulses that occur at the time that the frequency of a frequency modulated pulse is coincident with the resonant frequency of said structure with said object in the field of waves thereon,
means for generating a recurrent sawtooth waveform synchronized with and having at least the duration of said frequency modulated pulses,
means coupled to receive said gating pulses and said sawtooth waveforms and operating to produce output pulses whose amplitudes are proportional to the amplitudes of said sawtooth waveform during the occurrence of said gating pulse, and
means coupled to receive said first signal and the output of said last-named means to provide an indication of the resonant frequency of said structure as a function of the position of said perturbing object in the field of said waves.

3. Apparatus for automatically plotting a curve of resonant frequencies versus the positions of a field-perturbing object as the object is passed through a resonant electromagnetic wave structure comprising the combination of
- a resonant electromagnetic wave structure,
- means for coupling pulses of frequency modulated electromagnetic waves to said structure,
    - the frequencies of said waves being swept during each pulse period through a band of frequencies that includes a resonant frequency of said structure,
- a field-perturbing object positioned proximate said structure in a field of said waves and translatable therethrough,
- means for translating said perturbing object through said field of the structure,
- means for providing a first signal that varies in amplitude as a function of the position of said perturbing object relative to said structure,
- means coupled to said structure for deriving a frequency response signal representing the resonant frequency characteristics of said structure in response to said frequency modulated pulses,
- means for differentiating said frequency response signal to obtain a differentiated signal whose magnitude passes through a given reference level at a position corresponding to the maximum position of said frequency response signal,
- means for generating a gating pulse commencing at the time that said differentiated signal passes through said reference level,
- means for generating a waveform of uniformly-varying amplitude during the occurrence of each of said frequency modulated pulses,
- gating means coupled to receive said gating pulses and said uniformly-varying waveform and operating to produce an output signal whose amplitude is proportional to the amplitude of said varying waveform during the occurrence of said gating pulse,
- amplitude detector means for producing a continuous output signal whose amplitude is proportional to the amplitude of the output signal from said gating means, and
- recording means coupled to receive said first signal and said continuous output signal and operating to provide an indication of the resonant frequency of said structure as a function of the position of said perturbing object relative to said structure.

4. Apparatus for automatically plotting a curve of resonat frequencies versus the positions of a field-perturbing object as the object is passed through the electromagnetic field supported by a resonat electromagnetic structure, said apparatus comprising
- a resonant electromagnetic wave structure,
- means for coupling pulses of frequency modulated electromagnetic waves to said structure,
    - the frequencies of said waves being swept during each pulse period through a band of frequencies that includes a resonant frequency of said structure,
- a field-perturbing object positioned in the field of waves supported by said structure,
- means for passing said perturbing object through said field and for providing a displacement signal that varies in amplitude as a function of the displacement of said object through said structure,
- means for monitoring the resonant frequency characteristics of said structure in response to said frequency modulated pulses and for producing frequency response signals that provide an indication when the frequency of said pulses are coincident with the resonant frequency of the structure with said object in the field of waves supported by said structure,
- differentiating means for differentiating said frequency response signals to provide corresponding signals that pass through a zero reference level at the time corresponding to the time that the frequency response signals indicate that the frequency of a pulse is coincident with the resonant frequency of the structure,
- pulse generating means coupled to receive said differentiated signals and operating to produce gating pulses commencing at the corresponding times said differentiated signals pass through the zero reference level,
- a sawtooth waveform generator for producing sawtooth waveforms in synchronism with said frequency modulated pulses,
- gating means coupled to receive said gating pulses and said sawtooth waveforms and operating to produce output pulses whose amplitudes are proportional to the amplitudes of said sawtooth waveforms during the occurrence of corresponding gating pulses,
- box car detector means for producing a continuous output signal whose amplitude is proportional to the amplitudes of the output pulses from said gating means,
- and recording means coupled to receive said displacement signal and the output signal from said box car detector for providing an indication of the resonant frequency of said structure as a function of the displacement of said perturbing object through said structure.

5. Apparatus for automatically recording the resonant frequencies of a resonant electromagnetic wave structure as a function of the positons of a field-perturbing object that is passed through the electromagnetic field of waves supported by said structure, said apparatus comprising,
- means for coupling frequency modulated electromagnetic waves to said structure,
    - the frequency of said waves being swept within a given time interval through a range of frequencies that includes the resonant frequency of said structure,
- means for passing a field-perturbing object through the electromagnetic field of waves on said structure and for providing a displacement signal that varies in amplitude as a function of the displacement of said object through said structure,
- means coupled to said structure for producing a series of time-modulated pulses whose times of occurrence are a function of the resonant frequency of said structure with said perturbing object in the field of the waves supported by said structure,
- means for generating recurring waveforms of uniformly-varying amplitudes in synchronism with the frequency sweeps of said frequency modulated waves,
- means coupled to receive said time-modulated pulses and said varying-amplitude waveforms and operating to produce output signals whose amplitudes are a function of the times of occurrence of the time-modulated pulses,
- means coupled to receive said displacement signal and the output signals of said last-named means to provide an indication of a wave propagating characteristic of said structure as a function of the position of the perturbing object as said object is passed through field of waves supported by said structure.

References Cited by the Examiner
UNITED STATES PATENTS

| | | | |
|---|---|---|---|
| 2,579,464 | 12/51 | Bergemann | 324—58 |
| 2,680,837 | 6/54 | Sensiper | 324—58 |
| 2,988,695 | 6/61 | Leavitt | 324—79 X |
| 3,035,229 | 5/62 | Guderian et al. | 324—81 X |

WALTER L. CARLSON, *Primary Examiner.*